(12) United States Patent
Koshet

(10) Patent No.: US 10,664,910 B1
(45) Date of Patent: May 26, 2020

(54) CONSUMER PERMISSIONED ALTERNATIVE DATA FURNISHING

(71) Applicant: Crent Inc., Encino, CA (US)

(72) Inventor: Michael Ben Koshet, Woodland Hills, CA (US)

(73) Assignee: Crent Inc., Encino, CA (US)

(*) Notice: Subject to any disclaimer, the term of this patent is extended or adjusted under 35 U.S.C. 154(b) by 0 days.

(21) Appl. No.: 16/379,729

(22) Filed: Apr. 9, 2019

(51) Int. Cl.
*G06Q 40/00* (2012.01)
*G06Q 40/02* (2012.01)
*H04L 29/06* (2006.01)

(52) U.S. Cl.
CPC .......... *G06Q 40/025* (2013.01); *G06Q 40/00* (2013.01); *H04L 63/102* (2013.01)

(58) Field of Classification Search
CPC ..................................................... G06Q 40/00
See application file for complete search history.

(56) References Cited

U.S. PATENT DOCUMENTS

| | | | | |
|---|---|---|---|---|
| 2003/0097596 A1* | 5/2003 | Muratov | .................. | G06F 21/62 726/26 |
| 2008/0270301 A1* | 10/2008 | Jones | ...................... | G06Q 40/00 705/41 |
| 2015/0199757 A1* | 7/2015 | Lindholme | ............ | G06Q 40/12 705/30 |
| 2016/0110805 A1* | 4/2016 | Luna | .................... | G06Q 40/025 705/38 |

OTHER PUBLICATIONS

Krista Becker, Mobile Phone: The New Way to Pay?, Feb. 2007, Federal Reserve Bank of Boston, web, 1-11 (Year: 2007).*

* cited by examiner

*Primary Examiner* — I Jung Liu
(74) *Attorney, Agent, or Firm* — The McArthur Law Firm; Sean Lynch

(57) ABSTRACT

Systems and methods disclosed in this application are related to furnishing consumer-permissioned alternative data to one or more credit bureaus (e.g., Equifax, Experian, TransUnion, or any other worldwide CRA/major credit bureau). A user of the service platform provides credentials sufficient to access that user's account with a biller. Those credentials can be passed on to a third-party bill management and payment platform, which uses the credentials to log into the user's account with the biller. In some embodiments, bill data can be requested directly from a third-party biller without using a third-party bill management and payment platform. The third-party bill management and payment platform retrieves bill data from the biller and passes the bill data back to the service platform. The service platform then processes that bill data before generating a report to send to one or more credit bureaus.

9 Claims, 2 Drawing Sheets

CONSUMER PERMISSIONED ALTERNATIVE DATA FURNISHING

FIELD OF THE INVENTION

The field of the invention is consumer-permissioned data communication related to data furnishing.

BACKGROUND

The background description includes information that may be useful in understanding the present invention. It is not an admission that any of the information provided in this application is prior art or relevant to the presently claimed invention, or that any publication specifically or implicitly referenced is prior art.

When credit bureaus receive information about individuals, those individuals generally have no say in what information is received. Standard practices in credit reporting leaves out tremendous amounts of information that can benefit an individual's credit score, leaving open the possibility for a new service to package and send consumer-permissioned alternative credit data to credit bureaus. This new practice stands to improve credit scores and reports for multitudes of individuals that responsibly pay bills every month without receiving credit for those timely payments due to the inadequate nature of credit reporting.

Some have developed inventions related to generating reporting documents to send to credit bureaus, but those efforts nevertheless fall short. For example, US20150199757A1 to Lindholme et al. teaches subject matter directed to collecting payment information, verifying the payments, generating reporting documents, and then reporting those verified payments to a credit bureau. But Lindholme et al. fails to consider a several improvements, including improved modes of payment verification via a third-party bill management and payment platform.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

Thus, there is still a need in the art for improved systems and methods of furnishing consumer-permissioned alternative credit data to credit bureaus.

SUMMARY OF THE INVENTION

The present invention provides apparatuses, systems, and methods in which consumer-permissioned alternative credit data is furnished to credit bureaus. In one aspect of the inventive subject matter, a method of furnishing alternative credit data to one or more credit bureaus is contemplated to include the steps of: receiving, at a server, user credentials sufficient to gain access to a user's account with a third-party biller; sending, from the server, the user credentials to a third-party bill management and payment platform to allow the third-party bill management and payment platform to retrieve bill data from the user's account with the third-party biller; sending, from the server, a bill data request to the third-party bill management and payment platform; receiving, at the server, a bill data response comprising the bill data from the third-party bill management and payment platform; processing, by the server, the bill data to create at least one record in a server-maintained database, the at least one record comprising at least one of a payment, a due date for the payment, a balance, and a duration of payment delay; generating, by the server, a report formatted for receipt by at least one credit bureau (e.g., in Metro 2 format), the report comprising the at least one record; and sending the report from the server to the at least one credit bureau.

In some embodiments, the bill data request comprises an identifier associated with the user. In some embodiments, the server manages the server-maintained database using specialized software that is configured to generate credit reports (e.g., Credit Manager 4). Bill data can include one or any combination of a balance, a due date, a payment date, and a payment amount. A duration of payment delay can be a number of days greater than or equal to zero.

One should appreciate that the disclosed subject matter provides many advantageous technical effects including giving consumers an ability to provide verified payment information to credit bureaus to improve their credit scores or reports on their own terms and using information that is not ordinarily considered by credit bureaus.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Figure 1:
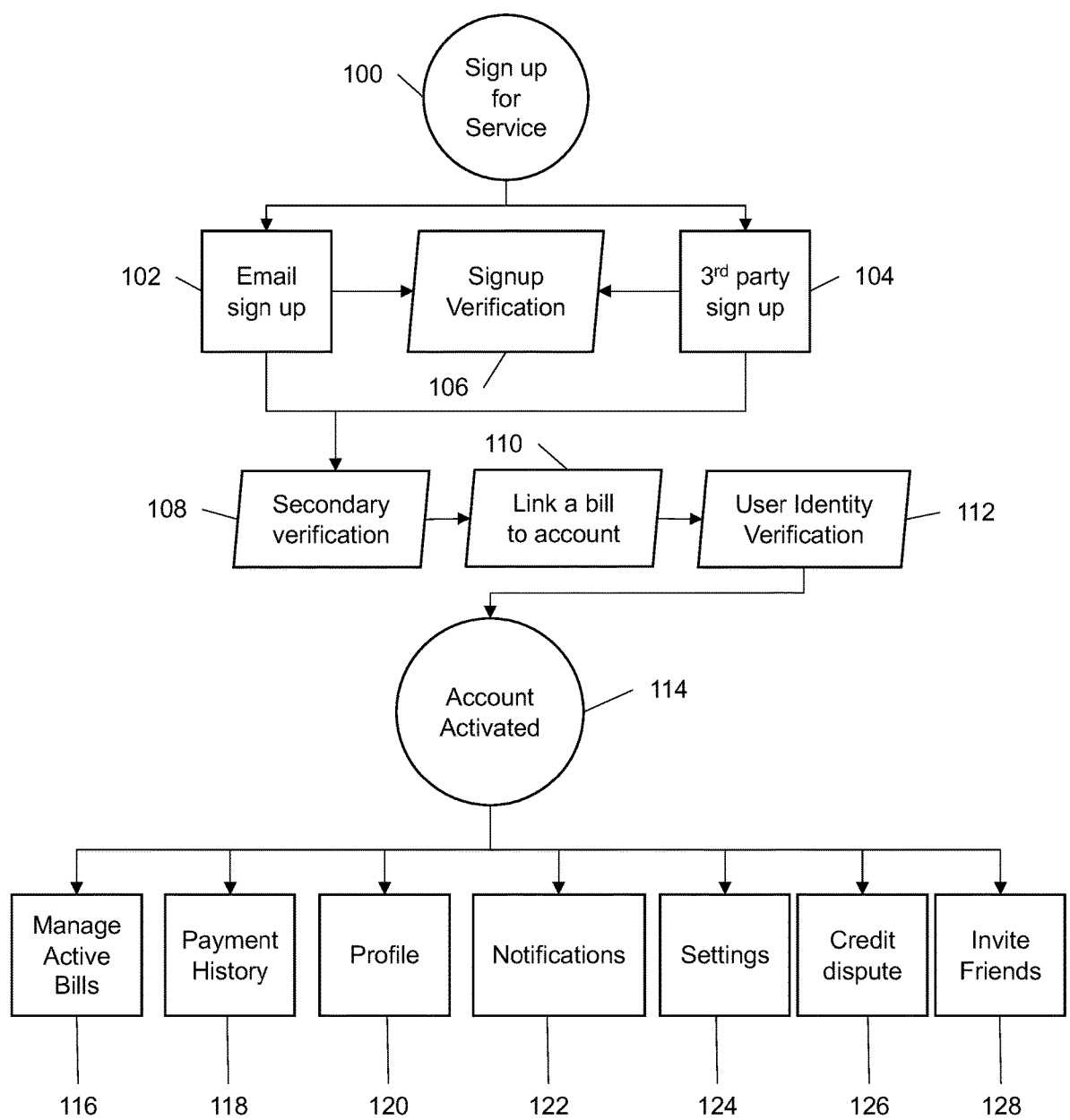
FIG. 1 is flowchart showing how users can register and then activate an account with a platform of the inventive subject matter.

FIG. 1 is a flowchart showing a setup process associated with embodiments of the inventive subject matter. The inventive subject matter is directed to a service platform comprising one or more servers that are configured to receive network communications from users' computing devices (e.g., laptops, tablets, PCs, mobile devices, smart phones, etc.). The service platform allows users to create accounts, authenticate their identities, and then submit consumer-permissioned bill payment information to credit bureaus that would not otherwise have been made available to those credit bureaus, thus giving users power over their financial futures by allowing them to self-report useful, beneficial credit information to improve their credit scores or reports.

To use the service platform, users must first sign up and activate their account. Step 100 is directed to the sign-up process. Signing up to use the service platform can be done using an email address as shown in step 102, or sign-up can be accomplished using a third-party platform account such as Facebook, Google, Amazon, etc. as shown in step 104. Signing up using an email address as in step 102 can also require a user to provide additional information, including one or any combination of a first name, a last name, an email address, a phone number, and a password. Signing up using a third-party platform can also require a user to provide additional information, including one or any combination of an app validation (e.g., Facebook validation), a first name, a last name, an email address, and a phone number. Regardless of the way a user signs up, the user must go through sign-up verification as shown in step 106. This can be accomplished, for example, by having a user click on an account verification link that is delivered to a user (e.g., to a user's email address or to a user's third-party account).

Once a user's account with the service platform is verified, the service platform can additionally require secondary verification, as shown in step 108. Secondary verification can include, for example, sending a text message, an email, using an authenticator app to generate a one-time code, or placing a phone call to a user's phone using a provided phone number. The user can be given a code (e.g., a one-time passcode) to verify their account and verify their phone number.

Next, as shown in step 110, the service platform can optionally prompt a user to link a bill to their account. This step can occur any time after a user has created an account.

As shown in FIG. 1, the step of linking a bill to a user's account comes after secondary verification (step 108) but before user identity verification (step 112), but it is contemplated that a user can link a bill to an account at virtually any time after steps 102 or 104. In some embodiments, the service platform does not accept bill data until step 114, and although users can link accounts with third-party billers before step 114, bill data is not saved into the service platform database until step 114 in such embodiments.

Users must also verify their identities with the service platform as shown in step 112. Because systems of the inventive subject matter involve reporting to credit bureaus, it can be important to verify certain information related to the user, including one or any combination of the user's date of birth, government identification code or number (e.g., a social security number), name, and address. This step is required to ensure that a user is who they say they are so that a user's bill payment activities can be reported to credit bureaus with proper association with that user.

Finally, as shown in step 114, a user's account can be fully activated, granting the user access to many different controls to their account, including one or any combination of, the ability to manage active bills 116, a payment history 118, a user profile 120, notifications 122, settings 124, a credit dispute panel 126, and an interface to invite friends to use the service platform 128.

Figure 2:
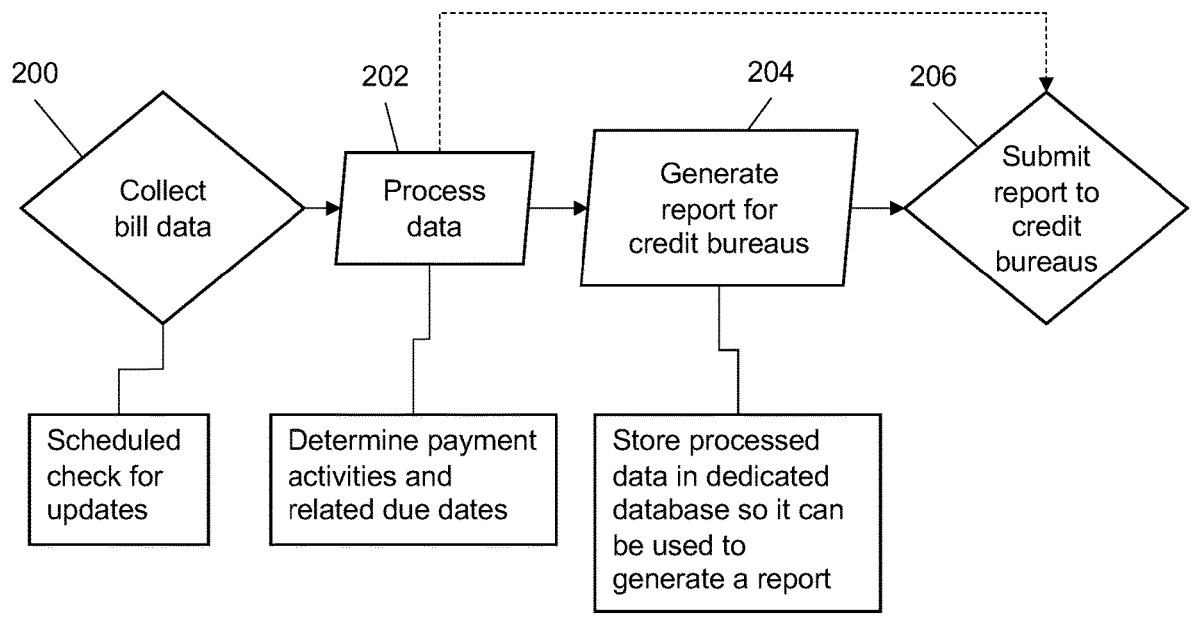
FIG. 2 is a flowchart showing how a platform of the inventive subject matter can collect user bill data to generate reports to be furnished to credit bureaus.

FIG. 2 is a flowchart showing how a service platform of the inventive subject matter furnishes consumer-permitted alternative credit data to credit bureaus. The first step is to collect bill data 200, the next step is to process the bill data 202, next the service platform generates a report that can be sent to credit bureaus 204, and finally the service platform submits that report to one or more credit bureaus 206.

The step of collecting bill data 200 involves checking for updates on a regular basis (e.g., hourly, daily, weekly, monthly, etc.). Updated bill data can include balance updates, due date updates, and bill payment records that can include payment dates and payment amounts. Bill data can be collected by via a third party, e.g., by accessing a third-party database using a third-party API. Third party APIs can come from, for example, bill management and payment platforms like Finovera or directly from a third-party biller. To access bill data, the service platform thus can send a bill data request (e.g., using a third-party's API) to a third-party that stores a user's bill data (e.g., bill data from a utility, a cell phone/wireless communication company, an insurance company, a cable company, an ISP, internet monthly subscription payments, a bank, a credit card company, etc.) and receives a bill data response from that third-party. The response includes one or any combination of balance updates, due date updates, and bill payment records that can includes payment dates and payment amounts. Two versions of this process are shown in FIG. 3, which shows the service platform directly accessing bill data from a third-party biller and also shows the service platform accessing bill data via a third-party bill management and payment platform.

The service platform can use a custom interface to link a bill to a user's account. As mentioned above, the service platform can use a third-party bill management and payment platform (e.g., Finovera) to retrieve bill data from a third-party biller. Users can thus be prompted by the service platform to grant the service platform access to pertinent bill data stored by one or more billers so that the service platform can collect users' bill data from those various billers. In some embodiments, collecting bill data from billers entails the service platform prompting the user to access bill data via the third-party bill management and payment platform. To do this, the service platform requests that a user input their credentials (e.g., credentials that allow a user to log into a third-party biller) so those credentials can be used by the third-party bill management and payment platform to retrieve bill data from a third-party biller (e.g., a utility, a cell phone/wireless communication company, an insurance company, a cable company, an ISP company, internet monthly subscription payments, a bank, a credit card company, etc.). When a user inputs their third-party biller credentials, the credentials are sent to the service platform via a network connection. Using the credentials to access bill data stored by the third-party biller, the third-party bill management and payment platform can then link a bill account having bill data from the third-party biller to a user's account with the service platform so that the service platform has access to that bill data.

Figure 3:
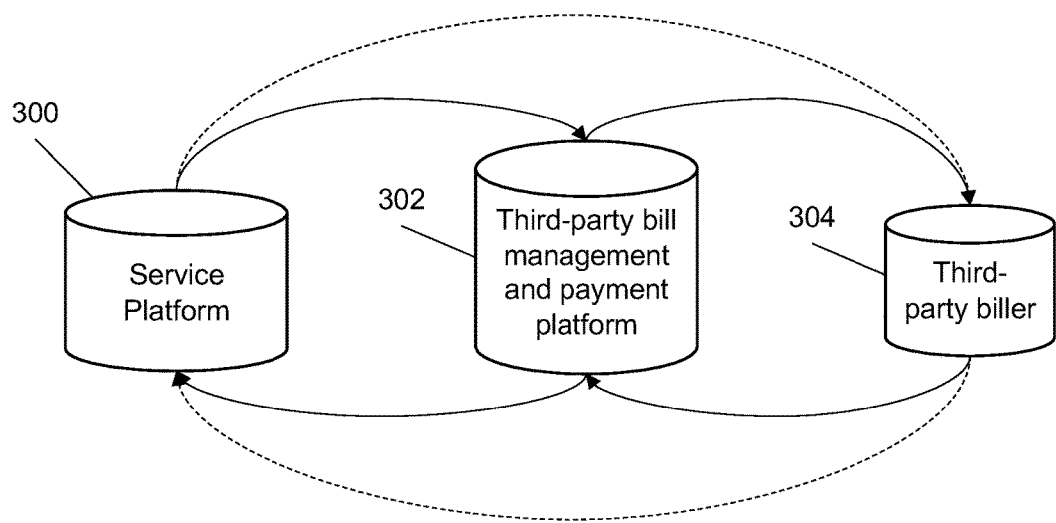
FIG. 3 shows how requests and responses can pass between a service platform, a third-party bill management and payment platform, and a third-party biller.

FIG. 3 shows how a user's credentials (e.g., credentials to access a user's account with a third-party biller) are passed from the service platform to a third-party bill management and payment platform. The service platform 300 sends the user's credentials to the third-party bill management and payment platform 302 over a network connection. In some embodiments, the communication that includes the user's credentials can further include one or any combination of an identifier associated with the user, a session identifier, or any other identifier sufficient to indicate to the third-party bill management and payment platform 302 which user or user account the credentials are associated with.

The third-party bill management and payment platform can thus use a user's credentials to retrieve bill data from a user's account with a third-party biller in a variety of formats, including PDF, CSV, etc., and that bill data is subsequently sent to the service platform. The service platform can thus receive bill data via the third-party bill management and payment platform and save that information to a database maintained by the service platform. The process of requesting bill data via a third-party bill management and payment platform can be seen in FIG. 3, which shows the service platform 300 sending a request for bill data to a third-party bill management and payment platform 302. This request can include, in some embodiments, one or both of a user identifier and a session identifier to indicate the request is associated with a particular user or session. The third-party bill management and payment platform 302 can then, in some embodiments, send a request for bill data to the third-party biller 304 that has the user's bill data. In some embodiments, the third-party bill management and payment platform 302 periodically sends requests for updated bill data to the third-party biller 304 (e.g., several times per hour, hourly, daily, monthly, or on an as-needed basis to update bill data such as when a user logs into the service platform or wants to collect updated data to send a report to a credit bureau, etc.), and the third-party biller 304 sends responses comprising updated bill data back to the third-party bill management and payment platform 302 to facilitate access by the service platform 300 on an as-needed basis (e.g., whenever the service platform 300 sends a bill data request to the third-party bill management and payment platform 302, bill data will already be available by virtue of the third-party bill management and payment platform's independent efforts to maintain up-to-date bill data). Up-to-date bill data can thus be accessed by the service platform 300 by sending a request for bill data to the bill management and payment platform 302, which can in turn generate a response comprising the most up-to-date bill data that is stored on the bill management and payment platform 302.

In some embodiments, the third-party bill management and payment platform 302 collects data updates from the third-party biller 304 (e.g., via one or more request-response pairs where a request for bill data is followed by a response comprising bill data). The bill management and payment platform 302 can pull data from the third-party biller 304 (e.g. by scraping pages on the third-party biller website, downloading bill statements from the third-party biller, sending requests for bill data and receiving responses comprising bill data, etc.), and the third-party bill management and payment platform 302 can then send a notification to the service platform 300 if it receives any updated bill data. If updated bill data is available on the third-party bill management and payment platform 302 and the service platform 300 is aware of its existence via, e.g., a notification from the third-party bill management and payment platform 302, then the service platform 300 can request updated bill data from third-party bill management and payment platform 302, thereby causes the third-party bill management and payment platform 302 to send a response comprising the updated bill data.

When the third-party bill management and payment platform 302 sends a request for bill data to the third-party biller 304, the third-party biller sends a response to the third-party bill management and payment platform 302 comprising the user's bill data. In some embodiments, the bill data can then immediately be sent from third-party bill management and payment platform 302 to the service platform 300 to be stored in a service platform-managed database, while in other embodiments, the bill data is stored in the third-party bill management and payment platform 302 until the service platform 300 sends a request for it. Bill data can include one or any combination of bill due dates, amounts due, recent payment amounts (e.g. the last payment amount), and recent payment dates (e.g., the last payment date), account information (e.g., account number, etc.), and account holder information (e.g., name, address, etc.). FIG. 3 also shows an optional configuration whereby the service platform 300 can directly request bill data from the third-party biller 304, and the third-party biller 304 can then send bill data directly back to the service platform 300 for storage in a service platform-managed database.

The service platform can additionally or alternatively be configured to access actual due dates/balances and latest payments related to a particular bill. A third-party bill management and payment service can also be used by the service platform to determine whether there are any updates that need to be recorded to the service platform-maintained database (e.g., updates to due dates, balances, payments, etc.). In some embodiments, the service platform can be restricted so that it receives no indication of whether a payment is on-time or delayed.

Next, the collected bill data must be processed, as shown in step 202. The service platform processes collected bill data in several ways, including: logging all due dates collected since a user's account with the third-party biller was linked to the service platform, logging all payments collected since a user's bill data was imported into the service platform, finding out if payments (e.g., payments detected in the bill data) were delivered on time (e.g., before a due date) or delayed (e.g., after a due date), identifying a duration of delay for delayed payments (if applicable), identifying an account status at the end of, e.g., a month (e.g., is the account fully paid, and, if not, how many days is the payment delayed? and past due amounts for an account). It is contemplated that a particular bill can have payments delayed for up to several months, so the service platform can be configured to keep track of all—or any subset of—due dates for each bill, and payments can be applied toward due dates that are the farthest in the future. It is contemplated that the service platform can handle bill data that includes information related to partial payments (e.g., where a user pays only part of a balance), full payments, and multiple payments (e.g., where a user pays several payments at once).

The service platform can be configured to determine payment status, e.g., whether a payment is late or on-time. In some embodiments, the service platform uses bill data to determine a due date for a bill based on the first payment that becomes due after the date the user first signs up to use the service platform. For example, if an amount due on a bill is $0 and the most recent payment date is not older than 30 days, then the service platform can report (e.g., by including this information in a report that is sent to one or more credit bureaus) the latest payment as being on time. In some embodiments, this rule applies to a first detected payment and not follow-up payments. If, on the other hand, the amount due is greater than $0, the service platform will not report the last payment, and it will wait for a new payment to show up after the sign-up date. As above, in some embodiments, this rule applies to a first detected payment and not follow-up payments. In some embodiments, the service platform tracks bill due dates and tracks whether a balance linked to a specific bill due date has been fully paid. In some embodiments, the service platform can determine when a balance has been fully paid, and the date that a balance is fully paid can then be used to determine whether the payment was delayed and by what duration (e.g., if the closing date is later than due date, the payment is late). Thus, in some embodiments, the service platform monitors unpaid bill due dates and a duration of delay for delayed payments, and it can then use this information when it coordinates generation of one or more reports to be sent to one or more credit bureaus (e.g., as an overall account status).

The service platform can be configured to execute a variety of rules related to processing bill data. In some embodiments, any time the service platform detects a balance of $0 on a bill, the active due date for that bill is closed (e.g., changed to inactive) and the service platform no longer calculates delayed payments related to that bill's due date. For each due date associated with a bill stored to a database maintained by the service platform, a flag can be added to indicate whether the bill has an active due date or an inactive due date. An active due date means that a bill remains unpaid (e.g., regardless of whether the bill is due or not yet due), and an inactive due date means that a bill has been paid. The service platform can thus track when a due date has closed (e.g., a bill has been fully paid and is inactive) so it can flag that due date as inactive when it closes. In some embodiments, the service platform determines a duration of delay for a late payment by taking a difference between a due date and date when the service platform flags that due date as inactive (e.g., as long as the inactive date is later than the due date, otherwise there is no delay).

The service platform can also track all other due dates associated with a bill. For example, if a user's bill has multiple due dates associated with it (because it is, e.g., three months overdue resulting in three due dates for the bill), that bill would have three active due dates associated with it according to the service platform. In addition, in some embodiments, a bill having multiple due dates and balances can be associated with a user's account on the service platform (e.g., a user's AT&T bill could have multiple due dates and balances such that bill payments can be associated with one or more due dates). A single tracked payment can be applied to multiple due dates or balances. It is also contemplated that multiple payments can be applied to a single due date or balance on a bill. It is contemplated that a single bill can be associated with multiple services, each having their own associated payments, balances, due dates, etc. (e.g., some ISPs offer cable television, internet, and phone lines bundled together, which gives rise to three different bills in one).

In some embodiments, When the service platform determines that a balance has changed but the associated due date remains unchanged, the service platform adds a new record (a record includes, e.g., one or any combination of a bill's due dates and balances) to the database for the bill associated with the changed balance, while flagging older records with same due date as inactive. In some embodiments, records include one or any combination of a bill's due date(s), associated balance(s), flag(s) for active or inactive due date(s) and due date closing time(s) (which can be added, e.g., only when applicable). The service platform can also determine whether a bill's balance has changed without an associated due date change when the third-party biller supplying the bill data indicates that the bill data associated with an account has been changed (e.g., a due date change, a balance change, or a new payment has been recorded). The service platform thus pulls updated bill data (e.g., from the third-party bill management and payment platform) and saves the updated bill data to the database it maintains (e.g., doing so whenever updates are available via the third-party bill management and payment platform). If a new balance for a bill is $0, a flag for the bill is set to inactive as the bill has been paid. If the balance has changed but no new payment is tracked, then at least one of two things can happen: (1) if the changed balance is lower than the immediately previous balance, then the service platform applies a credit to the balance of the oldest active due date, and (2) if the new balance is higher than the immediately previous balance, the service platform applies extra the balance to the newest active date.

To elaborate, the service platform can be configured to log due dates with associated tracked balances. In some embodiments, these can be logged separately. To do this, the service platform takes a tracked balance and calculates a difference between a current balance and a past balance. Depending on whether the difference between the two balances is positive or negative, the service platform can correct either a latest or newest active due date log (e.g., it corrects the bill's balance associated with a due date). For example, if a new balance is lower than an old balance (i.e., the service platform calculates a negative difference between the new balance and the old balance), that indicates a payment has been made to that balance or there has otherwise been some form of balance correction. This indicates the user doesn't owe as much, and so the service platform logs the changed balance in an associated record in its database by recording a payment to, e.g., the oldest balance on the bill having an active due date so that the service platform can report the lowest amount owed on the oldest unpaid due date to one or more credit bureaus, thereby painting the user in the best possible light. If, on the other hand, a new balance is higher than an old balance (i.e., the service platform calculates a positive difference between the new balance and the old balance), then the service platform can apply the increase to the newest active balance on that bill, thereby reducing the impact of that increase on the user's credit upon reporting the user's credit information to one or more credit bureaus.

When the service platform determines (e.g., by comparing new bill data with old bill data after sending a request for updated bill information from a third-party bill management and payment platform and then receiving updated bill data from that third-party bill management and payment platform) that a due date for a bill has changed (regardless of the bill's balance), the service platform can add a new record to its database indicating that the bill has an active due date. In such a situation, the service platform does not change a flag for any previous due date associated with this bill since it is still active. In some embodiments, each due date for a bill has a flag (e.g., an "active" flag or an "inactive" flag), and the service platform can log a new due date as active without changing any previously logged due dates or their associated flags. Each new balance is sum of all previous balances plus, and thus each new record in the service platform's database can be calculated as a new balance minus all previous active balances (e.g., a new amount owed).

If a new balance is $0 and the service platform detects a new payment (e.g., by pulling bill data from the third-party bill management and payment platform, where the bill data can include one or any combination of, for example, updates due date(s), updated balance(s), and updated payment information), then the service platform can record the new payment to its database, but it can apply the new payment at a later date when the bill's balance becomes non-zero. It is contemplated that if a balance ever goes below $0, then the service platform can generate a report indicating a $0 balance to be reported to credit bureaus. In some embodiments, the service platform does not record new payments based on changes in due dates or balances. Instead, the service platform can wait to receive specific payment information to record a new payment, otherwise, it considers changes in balances related to activity other than actual payments.

The service platform undertakes several steps in the course of implementing the rules discussed above. Broadly, the service platform is configured to match payments with active due dates, and when the service platform determines that a balance associated with an active due date is paid, it flags the due date as inactive. An example follows. First, when a new payment on a bill is detected, the service platform is configured to match it with the oldest active due date associated with that bill before calculating a new balance for that bill (e.g., the bill's balance minus the payment amount). If a bill's new balance after applying a payment is $0, then the service platform records the due date for that bill as inactive. If a bill's new balance after applying a payment is greater than $0, then the service platform records that bill's due date as active. If a bill's new balance after payment is less than $0, then the service platform records that bill's due date as inactive, the bill is flagged as inactive, and the remaining balance on the bill (e.g., the overpayment) can be moved to a newer, active due date associated with that same bill. In some embodiments, when the service platform flags a due date as inactive, is also records the date on which this change from active to inactive occurs.

In the event the service platform detects a new payment on a bill, the service platform calculates a difference between the oldest active due date for that bill and the payment date. In some embodiments, the resulting difference can be saved to a database for later retrieval, and it can additionally or alternatively be stored to internal memory (e.g., RAM) for more immediate and faster access. In some embodiments, the difference is used in the course of processing bill data and it is not necessary to store the difference to any particular non-transitory memory. If the oldest active due date for a bill is after the new payment date, then the service platform records 0 as the number of days that the payment is delayed. If the oldest active due date for a bill is in the past compared to a payment date, the service platform determines the actual amount of days as a difference between the bill's oldest active due date and the payment date. For example, when calculating how long a payment was delayed by, the service platform determines a difference between a payment date and the bill's due date for that payment. If the service platform determines that a bill payment has been applied to one or multiple due date on a bill (e.g., if a user has paid a bill for two months in a single payment), then the service platform can determine a separate duration of delay for each due date on that bill (e.g., the service platform can calculate a first delay of 30 days for January due date and no delay for a February due date). If, on the other hand, the service platform determines (e.g., by pulling bill data as described above) that a payment has been split between several due dates on a single bill, each separate payment can be recorded separately in the service platform-maintained database. Each of the separate records for split payments can indicate the same payment date with different payment amounts based on how much was applied to each due date, and a number of days between the payment date and the payment due date. This process can be repeated with each new constituent payment in a split payment (a split payment is e.g., when a user pays different amounts for different due dates on a bill at the same time) until the balance for the associated bill reaches $0.

When the service platform records a payment, each payment has some associated payment data that can include: a payment date, a payment amount, a due date that payment was applied to (e.g., if a payment is split between separate due dates, the payment can be tracked under two separate records), a number of days between a payment date and an applicable due date (generally, the number of days between a payment date and a due date will be shown as zero, but it can be different if the payment due date is in the past relative to a bill payment date.

The service platform can additionally be configured to determine an amount that is past due. An amount that is past due can be calculated by taking a sum of outstanding balances for payment due dates with active flags on a bill where payment due dates are older than, e.g., one or any combination of 1 week, 2 weeks, 3 weeks, 4 weeks, 1 month, 2 months, 3 months, 30 days, 60 days, 90 days, or any other duration of time whereby a bill can be considered past due.

It is contemplated that undertaken by the service platform are done relation to the last day of the month coming before the month in which the calculations are undertaken. The service platform thus collects bill data through each month, then at the beginning of the following month, it processes that bill data so that it can prepare one or more reports to send to one or more credit bureaus. This ensures that only completed data from each completed month is processed and furnished to a credit bureau. It is additionally contemplated that, in some embodiments. bill data can be processed and furnished to credit bureaus on an as-needed or on-demand basis.

An example of payment history data can be seen in Table 1, below, which includes columns for log date, payment amount, payment due date, and remaining balance.

TABLE 1

| Log Date | Payment | Due Date | Balance |
|---|---|---|---|
| 1-Mar | — | 30-Mar | $100 |
| 15-Mar | $50 | 30-Mar | $50 |
| 1-Apr | — | 30-Apr | $150 |
| 10-Apr | $50 | 30-Apr | $100 |
| 15-Apr | $100 | 30-Apr | $0 |
| 1-May | — | 30-May | $100 |
| 1-Jun | — | 30-Jun | $200 |
| 30-Jun | $175 | 30-Jun | $25 |
| 1-Jul | — | 30-Jul | $125 |
| 15-Jul | $125 | 30-Jul | $0 |

An example of a due dates log is shown in Table 2, below, which includes rows for log time (pre-payment), active due dates, and inactive due dates.

TABLE 2

| | Log time (before payment) | | | | | |
|---|---|---|---|---|---|---|
| | 15-Mar | 10-Apr | 15-Apr | 30-Jun | 15-Jul | 16-Jul |
| Open due dates | 3/30 ($100) | 3/30 ($50) 4/30 ($100) | 4/30 ($100) | 5/30 ($100) 6/30 ($25) | 6/30 ($100) 7/30 ($100) | — |
| Closed due dates | — | — | 30-Mar | 3/30 4/30 | 3/30 4/30 5/30 | 3/30 4/30 5/30 6/30 7/30 |

Table 3 shows an example payment log, which includes rows for payment date, payment amount, payment due dates, and number of days late.

TABLE 3

| | Pay Date | | | | | | |
|---|---|---|---|---|---|---|---|
| | 3/15 | 4/10 | 4/15 | 6/30 | 6/30 | 7/15 | 7/15 |
| Amount | $50 | $50 | $100 | $100 | $75 | $25 | $100 |
| Due Date | 3/30 | 3/30 | 4/30 | 5/30 | 6/30 | 6/30 | 7/30 |
| No. days late | 0 | 10 | 0 | 30 | 0 | 15 | 0 |

Using processed bill data and payment information, the service platform can then generate a report to send to credit bureaus, as shown in steps 204 and 206 in FIG. 2. In some embodiments, as shown by the dotted line connecting steps 202 and 206, the service platform can process bill data and then provide all or some subset of the processed bill data directly to one or more credit bureaus without spending any time generating a report. In some embodiments, the service platform sends processed data to a dedicated database that can be managed by database management software (e.g., a Credit Manager 4 (CM4)) database). The service platform then uses data stored to the database to generate reports that can be submitted to credit bureaus. It is contemplated that the dedicated database can either be managed by software installed on the service platform or by software that is installed on third-party servers (e.g., a cloud service). CM4, for example, is software that can be installed on a server maintained by the service platform, so that it can manage the dedicated database on a server or servers controlled by the service platform. In embodiments where database management software is run from servers outside of the service platform (e.g., a cloud service), it is contemplated that the dedicated database can be located either on the service platform or on cloud servers, and the database management software can access the dedicated database regardless of its location. Thus, the service platform can transport bill data to the database maintained by database management software (e.g., CM4). The database management software is fed processed bill data that can then be generated into one or more reports to be sent to one or more credit bureaus on behalf of users of the service platform.

As mentioned above, reports are generated by the database management software (e.g., CM4). Thus, the service platform uses that database management software to format processed bill data and payment information into a file format accepted by credit bureaus (e.g., Metro 2 or any other format accepted by credit bureaus). The service platform can thus send reports (or cause reports to be sent) to one or more credit bureaus on a periodic basis, e.g., daily, weekly, monthly, biannually, etc., and reports can additionally or alternatively be sent on a continuous basis, an on-requested basis, or on an as-needed basis. In some embodiments, the service platform sends reports to credit bureaus in coordination with the database management software. For example, database management software can send reports to credit bureaus upon request from the service platform.

Table 4, below, shows examples of information that can be included in credit reports that are sent to one or more credit bureaus.

TABLE 4

| Field | Required | Length | Example | Description |
| --- | --- | --- | --- | --- |
| Consumer Account Number | Y | 30 | CM415040000000A3 | prefix of "CM4" followed by the two-digit year and the two-digit month "CM40903" followed by zeros "CM4090300000000" The account number ends with A and an auto incremented number, e.g., "CM4090300000000A1" Completed account number, e.g., "CM4090300000000A1" |
| Portfolio Type | Y | 1 | O | |
| Account Type | Y | 2 | 4D | Cellphone = 4D Utility/Cable TV/Gass = 92 |
| Date Opened | Y | 8 | 1012010 | 8-character date format MMDDYYYY. |
| Credit Limit | A | 9 | 0 | Zero "0" for all bills. |
| Highest Credit or Original Loan Amount | Y | 9 | | n/a |
| Terms Duration | Y | 3 | 1 | Always be "001" |
| Terms Frequency | A | 1 | M | Always be "M", for Monthly |
| Scheduled Monthly Payment Amount | A | 9 | 0 | Always zero "0" |
| Actual Payment Amount | A | 9 | 1000 | The actual amount paid in a month |
| Account Status | Y | 2 | 11 | This is the current status of the account. 11 - Current Account. 0-29 days past due 71 - Past due 30-59 days 78 - Past due 60-89 days 80 - Past due 90-119 days 82 - Past due 120-149 days 97 - Charge off (closing account for lack of payments) 13 - Paid or Closed account, zero balance + Condition code XA |
| Payment Rating | A | 1 | | n/a |
| Payment History Profile | Y | 24 | 000100000000D000000BBBBB | This is a code that reports the last 24 months of payment history. Some examples: 24 on time payments - 000000000000000000000000 12 on time payments - 000000000000BBBBBBBBBBBB Code Numbers: 0 = 0 payments past due (current account) 1 = 30-59 days past due date 2 = 60-89 days past due date 3 = 90-119 days past due date 4 = 120-149 days past due date 5 = 150-179 days past due date 6 = 180 or more days past due date B = No payment history available prior to this time - either because the account was not open or because the payment history cannot be furnished. A "B" may not be embedded within other values. E = zero balance and current account D = No payment history available this month. A "D" may be embedded in the payment pattern. G = Collection L = Charge-off |
| Special Comment | A | 2 | | n/a |
| Compliance Condition Code | A | 2 | XA | Typically blank, but if, e.g., a customer closes their account, an "XA" here for "Account closed at consumer's request" (with Account Status = 13) |
| Current Balance | Y | 9 | 1000 | Bill current balance. No negative numbers in the case of a credit-negative numbers must be reported as "0." Only integer dollar values accepted (no fractions). |
| Amount Past Due | A | 9 | 500 | This field is for past due (over 30 days late) amounts only. Current balance should not be included. If account is current, this field should be zero. |

TABLE 4-continued

| Field | Required | Length | Example | Description |
|---|---|---|---|---|
| Original Charge-off Amount | A | 9 | | This will be blank, unless status code "97" is used. |
| Date of Account Information | Y | 8 | 6122017 | Report the date within the current month's reporting period that represents the most recent update to accounts, such as mid-month (08/15/2015) or end of month (08/31/2015) |
| FCRA Compliance/ Date of First Delinquency | A | 8 | 6122016 | Blank unless account is more than 30 days past due. If more than 30 days past due, then, e.g.:<br>This date must be more than 30 days after the Date Opened<br>The account must be at least 30 days late before reporting it as delinquent<br>Date format is MMDDYYYY<br>This should be a date of report when the late payment was reported. In case the account stay delayed, this date won't be changing. Changes back to blank once the account is paid off again. |
| Date Closed | A | 8 | 6122018 | Date the account is marked as inactive in format MMDDYYYY |
| Date of Last Payment | A | 8 | 6122017 | Date the last payment was made in format MMDDYYYY. Full or partial payments will update this field. If date is not available, use 01. |
| Consumer Transaction Type | A | 1 | | Used to indicate a change. Blank if no change:<br>1-Newly opened account, or new borrower associated with existing account<br>2-Name change<br>3-Address change<br>5-Social Security Number change<br>6-Name & Address change<br>8-Name & Social Security Number change<br>9-Address & Social Security Number change A-Name, Address and/or Social Security Number change |
| Surname | Y | 25 | Doe | Customer last name |
| First Name | Y | 20 | John | Customer first name |
| Middle Name | A | 20 | James | Customer middle name |
| Generation Code | A | 1 | J | Name suffix:<br>J = Junior<br>S = Senior<br>2 = II<br>3 = III<br>4 = IV<br>5 = V<br>6 = VI<br>7 = VII<br>8 = VIII<br>9 = IX |
| Social Security Number | HR | 9 | 123121234 | Customer social security number (9 digits) |
| Date of Birth | HR | 8 | 1311980 | Customer date of birth in format MMDDYYYY |
| Telephone Number | HR | 10 | 8188188181 | Customer phone number (10 digits) |
| ECOA Code | Y | 1 | 1 | Always "1" for Individual |
| Consumer Information Indicator | A | 2 | | n/a |
| Country Code | Y | 2 | US | |
| First Line of Address | Y | 32 | 1234 Main St. Apt 20 | Street name, Street number, and Unit number.<br>Characters Allowed: A-Z Alpha<br>0-9 Numeric<br>. (period)<br>/ (slash) - (dash) (Space) |
| Second Line of Address | A | 32 | Unit 12 | Unit number, Personal Mailbox Number Characters Allowed: A-Z Alpha<br>0-9 Numeric<br>. (period)<br>/ (slash) - (dash) (Space) |
| City | Y | 20 | Los Angeles | Customer City |

TABLE 4-continued

| Field | Required | Length | Example | Description |
|---|---|---|---|---|
| State | Y | 2 | CA | Customer state |
| Postal/Zip Code | Y | 9 | 90210 | Customer zip code |
| Address Indicator | N | 1 | | n/a |
| Residence Code | N | 1 | | n/a |

In the table above, Y indicates a required field, A indicates a field is required for certain verticals/conditions, HR indicates a field is highly recommended, and a blank field indicates the field is not required.

Once the service platform has generated a report (e.g., in coordinate with database management software, which can be incorporated into the service platform), it must then submit that report to one or more credit bureaus. As mentioned above, submission of reports to credit bureaus can be done either directly by the service platform (e.g., in embodiments where the database management software is incorporated into the service platform) or indirectly via database management software that functions in coordination with the service platform. For example, in embodiments where CM4 is used, CM4 can submit a Metro 2 file to one or more credit bureau (e.g., upon receiving a request to submit the report from the service platform).

In accordance with the inventive subject matter, the service platform can thus receive bill data from any third-party biller (e.g., either directly or via a third-party bill management and payment platform) and it can then process that bill data before generating a report to send to one or more credit bureaus. The service platform can be configured (e.g., by incorporating or implementing database management software) to generate reports in any format that is compatible with any credit bureau. Credit bureaus that the service platform can send reports to include, but are not limited to, Equifax, Experian, TransUnion, or any other worldwide CRA/major credit bureau. Data transfer can be managed by database management software such as CM4, but in some embodiments, reports are furnished to credit bureaus directly by the service platform (e.g., when the service platform has database management software directly included).

A wide variety of information can thus be furnished to credit bureaus, including: amount paid (e.g., a sum of all monthly payments per bill), account status (e.g., whether a balance is fully paid or past due along with, optionally, a duration of time an amount is past due in hours, days, weeks, months or some combination thereof), a payment history profile (e.g., a record comprising up to the last 24 months of account statuses—whether bills are on time or past due and how many days each bill is past due, if applicable), a current balance on a bill (e.g., the latest account balance), an amount past due, a date when the account information (e.g., bill data) was last retrieved from a third-party biller, a date of last payment, a user's personally identifiable information (PII), and a date the user opened an account with the service platform.

Thus, specific systems and methods of furnishing consumer-permissioned alternative credit data have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of furnishing consumer-permissioned alternative data to one or more credit bureaus, the method comprising:
   receiving, at a server from a client device controlled by a user, user credentials sufficient to gain access to the user's account with a third-party biller;
   sending, from the server to a third-party bill management and payment platform, the user credentials to allow the third-party bill management and payment platform to retrieve bill data from the user's account with the third-party biller;
   sending, from the server to the third-party bill management and payment platform, a bill data request;
   receiving, at the server from the third-party bill management and payment platform, a bill data response comprising the bill data in a first format;
   processing, by the server, the bill data to create a set of bill records that are stored in a server-maintained database, each bill record stored in the database comprising a payment, a payment due date, and a balance;
   modifying each bill record in the database by flagging each bill record from the set of bill records as either active or inactive, wherein an active bill record comprises an unpaid bill and an inactive bill record comprises a paid bill;
   converting, by the server, the bill records stored to the database into a report in a second format to be sent to at least one credit bureau, the report comprising the set of bill records from the database converted from the first format to the second format; and
   sending, to the at least one credit bureau from the server, the report in the second format.

2. The method of claim 1, further comprising verifying the identity of the user.

3. The method of claim 2, wherein verifying the identity of the user comprises delivering an account verification link for the user to click.

4. The method of claim 1, further comprising verifying the user's identity by requesting at least one of the user's date of birth, social security number, name, and address.

5. The method of claim 1, wherein the second format is Metro 2.

6. The method of claim 1, wherein the server manages the server-maintained database using specialized software that is configured to generate credit reports.

7. The method of claim 1, wherein the bill data comprises at least one of a balance, a due date, a payment date, and a payment amount.

8. The method of claim 1, wherein the duration of payment delay is a number of days greater than or equal to zero.

9. The method of claim 1, wherein the report comprises at least one inactive bill record.

\* \* \* \* \*